INVENTORS
RICHARD R. CLUNE
HERMAN SCHEIBLER
BY
ATTORNEY

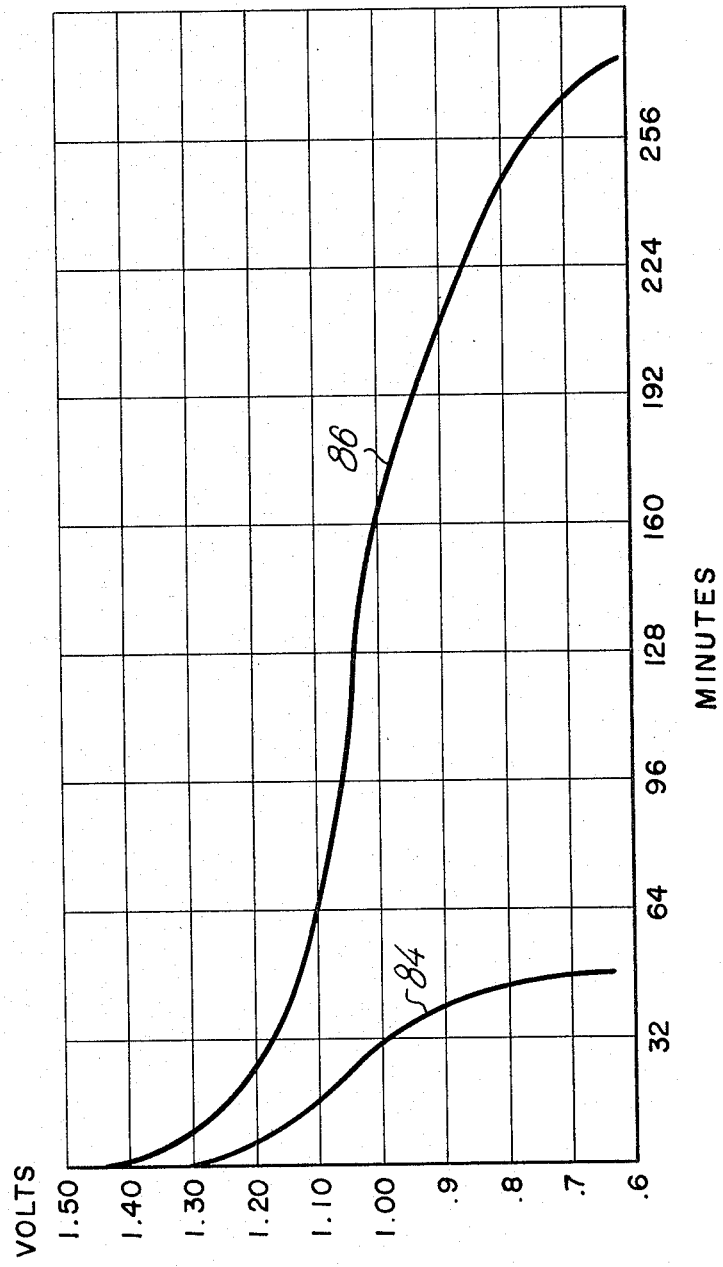

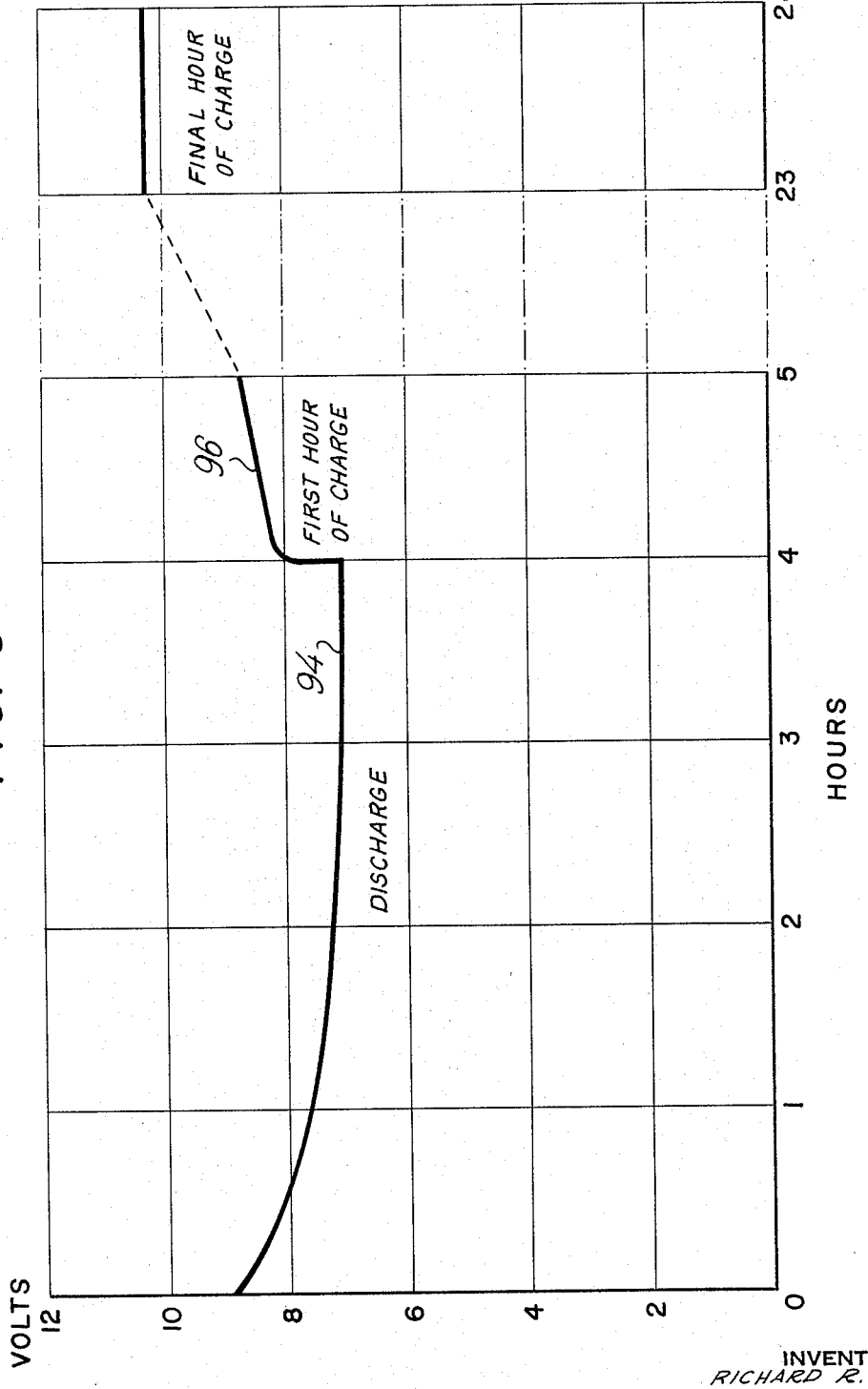

United States Patent Office 3,332,802
Patented July 25, 1967

3,332,802
ELECTRIC CURRENT PRODUCING CELL
Richard R. Clune, Ardsley, and Herman Scheibler, Katonah, N.Y., assignors to P. R. Mallory & Co., Inc., Indianapolis, Ind., a corporation of Delaware
Filed Nov. 5, 1964, Ser. No. 409,171
7 Claims. (Cl. 136—83)

This invention relates to electric current producing cells, and more particularly, to alkaline cells which can be operated both as primary and secondary cells.

With the continuously growing public acceptance of battery-operated portable radios, TV sets and many other new battery-operated devices from toys to shavers, wrist watches and heart-beat stimulators, the demand for portable sources of electric power has increased tremendously in recent years. This demand varied from a few microamperes per hour to several ampere hours per volt, and from a continuous delivery of current for the entire service life of the cell, to pulses of a few seconds, or even milliseconds, at a time. Literally, hundreds of different types of new dry and wet primary and secondary cells were created by the industry to meet the specific requirements of smaller or larger segments of this entire market. Finally, from the point of view of cost, the demand varied from applications where the cost of the cell was negligible, all the way to where cell cost was the most important, or one of the most important factors.

It is an object of the present invention to improve electrical current producing cells, specifically alkaline cells and batteries.

It is another object of the invention to provide a novel and improved all-purpose alkaline cell having an excellent weight-volume to capacity ratio at normal drains and temperatures; a good performance record at temperatures ranging as low as —20° F. and as high as 160° F.; a good performance record both at very light and very heavy drains, continuous or intermittent; having novel means for sealing and venting; and capable of being recharged and thus used as a secondary cell.

Other and further objects and advantages of the invention will become apparent from the following description, taken in conjunction with the accompanying drawing, in which:

FIGURE 4 shows results of comparative tests for discharging a conventional cell and the cell embodying the invention;

FIGURE 6 shows charge and discharge curves of cells embodying the principles of the invention, when used as secondary cells for operation of a portable TV set.

Figure 1:
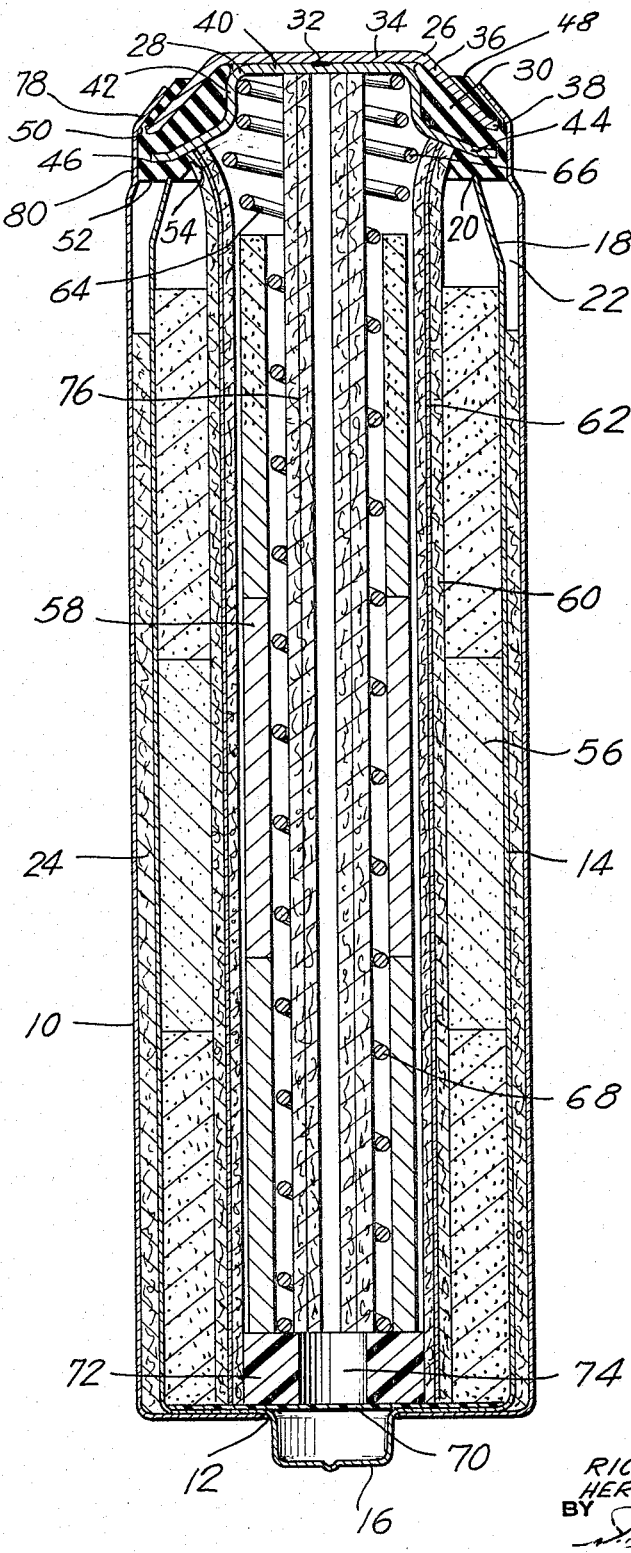
FIGURE 1 is a longitudinal sectional view of a cell embodying the invention.
Figure 2:
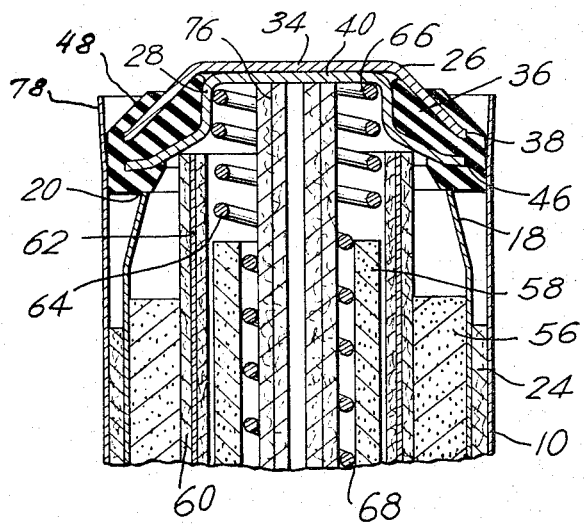
FIGURE 2 is a similar view of the upper portions of the cell shown in FIG. 1, prior to crimping and permanently sealing the cell.

Referring now more particularly to FIGS. 1 and 2 of the drawing, reference numeral 10 denotes a cylindrical outer can of nickel-plated steel having a circular aperture 12 in its bottom. An inner can 14 of similar shape but of somewhat smaller diameter is arranged within outer can 10 and is provided with a nipple 16 at its lower end protruding through and forming a mechanically tight, but gas-permeable, fit with aperture 12 of the outer can. The upper end of the inner can is somewhat constricted inwardly as indicated at 18 and terminates in a ridge 20. Interspace 22 between the inner and outer cans is filled out with an absorbent spacer 24, such as one of paper. Preferably, the inner can is formed of steel which is first nickel-plated and then gold-plated. The cell is closed by a so-called molded double top construction of the general type disclosed in Clune Patent 3,096,217 comprising an outer dished top disc 26, an inner top disc 28 nested in the outer disc, and an insulating and sealing grommet 30 of a suitable elastomer, such as high density polyethylene, molded around the circumferential ridges of discs 26 and 28, extending into and substantially filling out the interspace between the said discs. As it is disclosed in the above-mentioned Clune patent, outer disc 26 is preferably formed of steel which is nickel-plated both on its outer and inner surfaces, whereas inner disc 28, likewise formed of steel, is nickel-plated on its outer surface and is tin-plated on its inner surface. The absence of dissimilar metals from the interspace between the top discs eliminates the possibility of electrolytic corrosion in said space whereas the tin plating on the inner surface of the inner top disc is capable of forming a low resistance electrical connection between the said disc and the amalgamated zinc anode. Permanent and reliable mechanical and electrical connection between the two discs is assured by means of a welded joint 32.

Referring further to the top closure discs, it will be noted that outer disc 26 comprises a generally plane center portion 34, and a downwardly depending flange portion 36 terminating in circumferential ridge 38. As to inner disc 28, it comprises a plane center portion 40, continued downwardly in a cylindrical intermediate portion 42 and terminating in an outwardly extending flange 44 having a circumferential ridge 46. The molded grommet 30 comprises an inclined upper surface 48, a cylindrical intermediate surface 50 and a plane bottom surface 52. The said bottom surface inwardly merges with a second inclined surface 54, the function of which will appear as the description proceeds.

The electrochemically active components of the cell comprise the positive electrode, or depolarizer 56, the negative electrode 58, and an alkaline electrolyte which permeates both electrodes, as well as the absorbent spacer layers 60 and 76 and barrier layer 62, separating the two electrodes of essentially hollow cylindrical shape.

In the preferred embodiment of the invention, the positive electrode 56 is composed of manganese dioxide, mercuric oxide, or of a combination of both, intermixed with a suitable inert and electronically conductive material, such as graphite. Thus, good results are obtained with a mixture of 91% by weight of electrolytic manganese dioxide and 9% by weight of Madagascar graphite although other proportions can be used. In general, the practical range of graphite by weight in $MnO_2$ depolarizer is from 5% to 20%. One or more annular depolarizer bodies are pressed from this mixture having such dimensions as to form tight fit and good electrical contact with the inner surface of inner can 14. The negative electrode 58 is made of amalgamated and sifted zinc powder to which from about 0.5% to about 4% by weight of sodium carboxy methyl cellulose (CMC) has been admixed in dry powder form. After thorough blending of the amalgamated zinc and CMC, the resulting powder is pressed into hollow cylinders of suitable dimensions to a density of between 80 and 95 grams per cubic inch. These cylinders are surrounded by several layers 60 of an absorbent spacer material, such as Dexter paper, and by at least one layer 62 of a suitable ionically permeable barrier material, such as dialysis or parchment paper.

To insure reliable and permanent electrical connection between the negative electrode 58 and top discs 26 and 28 constituting the negative terminal of the cell, there is provided a contact member 64 (FIG. 3) in the form of a helical spring made of tin-plated piano wire or of amalgamated Phosphor bronze wire. The upper portion 66 of the contact member, comprising the first few turns of wire, has an increased diameter, so dimensioned that it just fits the cylindrical intermediate portion 42 of inner top disc 28. The lower portion 68 of the contact member 64 is of a smaller diameter and is so related to the inner diameter of the compressed zinc-CMC cylinders 58 that the former slides easily into the latter without exerting any radial pressure upon the inner walls of the dry zinc-CMC cylinders.

To eliminate the possibility of direct metallic contact and shorting out the cell between the bottom of inner can 14 and the lower end of contact member 64, a suitable insulating disc 70, preferably one punched from a 0.005" thick polystyrene sheeting, is placed in the bottom of the inner can. To facilitate assembly of the zinc-CMC cylinders into the inner can containing the consolidated depolarizer 56, a tightly fitting Neoprene slug 72 pressed into the inside of the tubular absorbent spacer 60 may be used. The thickness of slug 72 may vary from 0.020" to 0.100" and the said slug is provided with an aperture 74 in its center. A tubular inner absorbent 76, likewise formed of a few turns of Dexter paper, is arranged in the inner space of contact member 64 and extends from inner top disc 28 down to neoprene slug 72.

With particular reference to FIG. 2 of the drawing, the assembly precedure used in the manufacture of the cell of the invention is as follows:

A. It is to be observed at the outset that, initially, the rim of inner can 14 is formed to have a slightly outwardly sloping flange (not shown). The depolarizer assembly is made ready by placing the polystyrene insulating disc 70 into the bottom of the inner can, inserting three preformed depolarizer cylinders 56, and consolidating the said cylinders by means of a suitable tool. Thereupon the mouth portions of the inner can are crimped inwardly, as shown at 18 in the drawing.

B. The consolidated depolarizer assembly described in Item A, is filled with the electrolyte and allowed to stand for 30 to 45 minutes to have the depolarizer absorb some of the electrolyte. The preferred electrolyte is an aqueous solution of an alkali metal hydroxide containing a substantial amount of alkali metal zincate. Thus, an electrolyte suitable for normal operating temperatures may be composed of 40% KOH, 6.25% of ZnO, balance water, and an electrolyte suitable for low operating temperatures (32° F. and below) may be composed of 37.5% KOH, 3.5% ZnO, balance water, all percentages being by weight. Other proportions of KOH, ZnO and water may be used, as is disclosed in Ruben Patent 2,422,045.

C. The anode assembly is made ready. This consists in placing slug 72 inside the tubular absorbent spacer 60. Three preformed cylindrical zinc-CMC anodes 58 are then placed into the open end of the said spacer and the contact member or spring 64 is placed into the anodes so that the reduced diameter portion 68 of the spring is loosely fitting into the center aperture of said anodes.

D. The absorbent spacer 24 is placed inside the outer can 10. The consolidated depolarizer assembly, with electrolyte (B above) is than placed into this assembly.

E. The anode assembly (C above) is then placed into the subassembly (D above). The object of aperture 74 in slug 72 is to allow the electrolyte to pass up through the center of the anode assembly while it is being placed into the consolidated depolarizer assembly. Upon contact with the electrolyte, the dry and solid zinc-CMC cylinders are converted into an expanded CMC zinc amalgam.

F. The inner absorbent tubular spacer 76 is placed inside the contact member or spring 64.

G. The molded double top, comprising outer disc 26, inner disc 28 and grommet 30, is then placed and the cell is sealed by crimping down the top mouth portions 78 of outer can 10 against surface 48 of the grommet 30 and radially constricting portion 80 of the outer can against surface 50 of the grommet.

Figure 3:
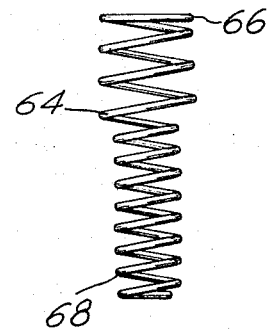
FIGURE 3 is a front elevation of the contact member or spring, which provides electrical connection between the negative electrode and the inner top disc of the cell.

Looking at FIGS. 1–3, and particularly at FIGS. 1 and 2, it will be readily appreciated that when crimping the cell, the following structural changes take place inside of the cell.

The lower portion 68 of contact member 64 is held firmly embedded in the zinc-CMC-electrolyte mix confined between outer and inner absorbent spacers 62 and 76, respectively. In crimping the cell, the top structure is pressed in a downward direction. This will place top portion 66 of the contact member under compression, causing it to increase in diameter, thereby exerting pressure on the walls of the cup-shaped center portion 42 of the inner top disc 28. Creation of pressure contact between the said inner top disc and the contact member will assure reliable electrical connection between the anode and its terminal, the outer top discs, through the intermediary of the contact member and the inner top disc.

Once this tight pressure contact has been established, further expansion of the top portion 66 of contact member 64 is impeded. Therefore, further downward pressure on the top will cause the lowest one or two spirals of top portion 66 of the contact member to enter into the upper end of outer absorbent spacer 60. This will displace the upper terminal portions of the said spacer outwardly, bringing them from the position shown in FIG. 2 into the one shown in FIG. 1, wherein the said portions 82 are forced against inner face 54 of grommet 30. Thus, spacer 60 will form an effective shield, preventing any zinc-CMC-electrolyte particles from migrating over the rim of the said spacer, reaching eventually inner can 14, or depolarizer 56. Preventing migration of these particles is an important function of the structure of the invention, because otherwise such particles would establish an internal conductive metallic path between the positive and negative electrodes, causing destruction of the active electrochemical ingredients in the cell.

As it has been pointed out in the foregoing, the diameter of the lower portion 68 of contact member 64 is so related to the inner diameter of the compressed zinc-CMC cylinders 58, that the former slides easily into the latter without exerting any radial pressure upon the inner walls of the dry zinc-CMC cylinders. The excellent electrical contact between the contact member and the said cylinders is not due to any pressure therebetween but is due to the fact that interaction of the cylinders with the electrolyte will cause the said cylinders to expand and fill tightly and completely the interspace between the inner and outer absorbents 76 and 60, respectively.

In the preparation of the zinc-CBC cylinders, the consistency of the amalgamated zinc particles as to particle size is not of appreciable importance. One formula proven to provide very satisfactory results comprises the sifting of the amalgamated zinc powder through a sieve of 60 mesh onto one of 100 mesh. All zinc particles accumulated on the 100 mesh sieve are to be used. To the dry zinc powder thus obtained, dry CMC powder is added in quantities from ½% to 4% by weight. This powder is then thoroughly mixed and, finally, the anode cylinders are pressed from the mixture to a density of 80–95 g. per cubic inch. Great care must be taken to keep this zinc-CMC mixture dry during all phases of the manufacturing process from initial storage of the raw materials to mixing and blending of the zinc and CMC, to the making of the finished cylindrical or flat anode pellets, storage of same, right up to the time when these zinc-CMC pellets are assembled into the cell.

In a modification of the process just described, the zinc-CMC electrode is provided without preforming the mix of zinc and CMC powders into a predetermined shape at a predetermined density. In this case, the inner absorbent spacer 76 is eliminated. The outer absorbent spacer 60 with slug 72 and contact member 64 is inserted into the depolarizer 56 and then a predetermined quantity of the dry zinc-CMC mix is poured into the said outer spacer. Under the effect of the electrolyte previously provided in the depolarizer assembly (Step B), and rising in the spacer 60 through aperture 74 of slug 72, the dry mix will be converted into an expanded CMC zinc amalgam in which amalgamated zinc particles are distributed in the gelled, viscous electrolyte.

One of the important advantages of the cell of the invention is a greatly improved seal. In conventional cells the usual "crimp" seal consisted in folding the rim of the outer container or can onto an insulating disc, which may be a plastic or cardboard, or take the shape of an elastic grommet sealed on top of the inner can and which may also serve to seal and insulate the single or double top metal closure member of the cell. In structures of the described character, the containment of the electrolyte inside the cell depended upon the effectiveness of flat surfaces pressed together to block the passage or creepage of electrolyte. In accordance with the invention, these conventional sealing structures are greatly improved in effectiveness by the addition of horizontal and vertical pressure ridges 38, 46 and 20. Through proper shaping of the crimper head, the outer can 10 is compressed inwardly to a permanently smaller diameter in its upper portion 80, while the cell is being crimped. Rim 38 of the outer top disc 26 and rim 46 of the inner top disc 28 form two permanent lateral pressure ridges strongly pressed against the elastic material constituting the molded grommet 30 by the constriction 80 permanently impressed into the metal of the outer can.

A third pressure ridge is formed by the rim 20 of inner can 14. In the event of the use of preformed depolarizer pellets, as identified by numeral 56 in the foregoing, rim 20 of inner can 14 is formed originally to have a slightly outward sloping flange. After consolidation of the preformed depolarizer pellets, the said flange is reformed to the inwardly curving shape shown in FIGS. 1 and 2 of the drawing. In the crimped and sealed condition of the cell (FIG. 1), rim 20 is pressed against the underside 52 of grommet 30. The degree of sealing efficiency of pressure ridge 20 is largely determined by the actual degree of the slope. If the rim slopes only slightly, it may cut into the grommet too deeply and eventually may reach a direct contact thus shorting the cell from inner can 14 to inner top disc 28. If, on the other hand, the rim slopes too much, the pressure ridge effect becomes lost. The best sealing effect is obtained if the inward slope of the top portion of inner can 14 is held to about 12° to 25°, as measured from the vertical.

The pressure ridge seals of the invention have proven to be a highly efficient means of preventing even alkaline electrolytes from creeping or leaking from a sealed cell. However, if from incidental shock or vibration, a displacement is caused in the relative positions of inner and outer cans 14 and 10, respectively, one or several of the seals may be impaired. To insure permanently stable positioning of inner can 14 inside outer can 10, so that such positioning is not adversely influenced by vibration or shock, the diameter of nipple 16 in the bottom of inner can 14 and the diameter of the aperture 12 in the bottom of outer can 10 are so related as to produce a coined press-fit of the radius where the said nipple emerges from the said aperture at the instant when the cell is crimped. This press-fit has to be gas permeable so as not to interfere with the venting of the cell. Thus, at one end, inner can 14 is held by pressure ridge 20 embedded in underface 52 of grommet 30, while, at its other end, the said can is held securely in position by nipple 16 pointed into aperture 12.

The structure just described makes the cell of the invention shock and vibration proof and maintains it completely sealed even under adverse operating conditions. In the event, however, that for any reason, for example, due to the presence of impurities in the electrochemically active cell materials, excessive internal gas pressure develops in the cell, such pressure will lift up slightly the top closure member 26, 28. This will permit the developed gases to pass around ridge 20 of the inner can into interspace 22 between the inner and outer cans and from there into the exterior through the passageway constituted between nipple 16 and aperture 12. Any electrolyte that may be carried along by the vented gas is absorbed by absorbent spacer 24. By varying the rigidity of the bottom portion of the outer can 10, a certain measure of control can be achieved over the degree of internal cell pressure at which the cell begins to vent. The more rigid is the bottom of outer can 10, the higher is the pressure required to initiate the venting process, and vice versa. The rigidity of the can bottom may be varied either by control of material thicknesses, by heat treatment, or by adding slots or holes in the bottom of outer can 10.

The curves in FIG. 4 indicate results of a standard high intensity flashlight test for a conventional "AA" size production cell, Type Mn1500 (curve 84), and a cell of "AA" size, Type Mn1500–CMC, embodying the invention (curve 86). Both cells had the same dimensions and contained the same quantity of zinc. In carrying out this test, a load of 4 ohms was used, which was alternately connected across the cell for 4 minutes, and was disconnected therefrom for 11 minutes, for 8 hours per day. It will be noted that the voltage of the conventional cell steeply dropped from 1.44 volts to 0.63 volt in 48 minutes, whereas the cell of the invention supplied current under the same operating conditions for about 277 minutes.

Figure 5:
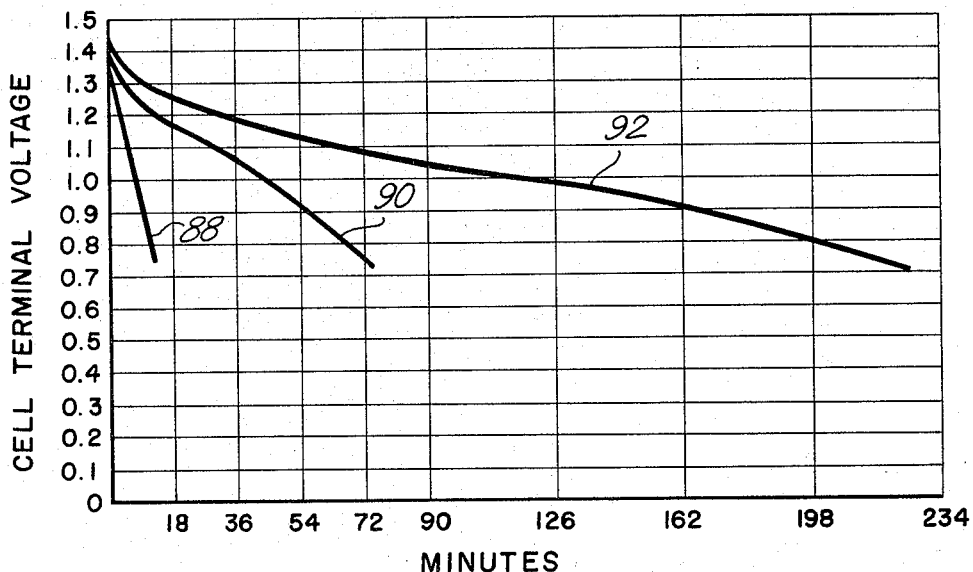
FIGURE 5 shows results of comparative low-temperature tests between a conventional C size cell, an improved conventional cell comprising a larger anode, and a cell embodying the invention.

FIG. 5 shows results of comparative low temperature tests between a conventional C size cell, Type Mn1400 (curve 88), having the anode spaced 0.080″ from the cathode, a similar conventional C size cell, Type Mn1400 (curve 90), having the anode spaced 0.040″ from the cathode, and the cell of the invention, Type Mn1400–CMC (curve 92). All cells had the same dimensions and contained the same quantity of zinc. In each test, three of the respective cells were connected in series and were discharged at 32° F. through one PR–7 bulb, representing a load of 12 ohms, until their voltage dropped from about 1.35 volt to about 0.7 volt. The discharge times were 14, 76, and 225 minutes, respectively.

FIG. 6 illustrates charge and discharge curves, 94, 96 of C size cells, Type Mn1400-CMC, embodying the invention, when used as secondary cells for operating a portable TV set. Six of the cells were connected in series and were operated at a drain of 250 milliamperes and charged at the maximum regulated rate of 250 milliamperes. The cells were discharged for 4 hours and then charged for 20 hours per day. It will be noted that, on discharge, the voltage of the cells dropped in one hour from about 9 volts to about 7.6 volts but had an approximately flat discharge curve 94 for the remaining 3 hours. As indicated by the charging curve 96, the cells approximately reached their original fully charged voltage after the first hour of charging.

From the comparative tests illustrated in FIGS. 4–6, the great superiority of the cells of the invention over conventional cells under the most diverse operating conditions becomes clearly apparent.

Although the present invention has been disclosed in connection with preferred embodiments thereof, variations and modifications may be resorted to by those skilled in the art without departing from the principles of the present invention. All of these variations and modifications are considered to be within the true spirit and scope of the present invention, as disclosed in the foregoing description and defined by the appended claims.

What is claimed is:

1. An electrical current producing cell comprising, in combination, a nickel-plated steel outer can open at its top and having an aperture in its bottom, a gold-plated steel inner can open at its top ending in a ridge and having a nipple depending from its bottom, said nipple extending through and forming a fit with said aperture, outer and inner steel top closure discs in the open end of said outer can having their center portions nested in and their circumferential ridges separated from each other, said outer disc being nickel-plated on both of its faces and said inner disc being nickel-plated on its outer face and being tin-plated on its inner face, an elastic sealing grommet molded around said top closure discs, positive and negative electrodes in said inner can and in electrical contact with said can and with said top discs, respectively, a spacer layer interposed between said electrodes, and an alkaline electrolyte impregnating said spacer layer and said electrodes, the terminal regions of the outer can being crimped down and its adjoining regions being radially constricted to press the ridges against cooperating portions of said grommet thereby to seal the cell, said top discs being capable of venting displacement under the effect of excessive internal gas pressure to vent such gas pressure around the edge of the inner can and through the interspace between inner and outer cans and between said aperture and nipple to the exterior.

2. An electrical current producing cell comprising, in combination, an open-ended outer can, an open-ended inner can concentrically mounted in said outer can and having its open end terminating in a ridge, a top closure member comprising an outer dished disc and an inner cup-shaped disc, and a sealing grommet around said discs in sealing engagement with said ridge, a first active cell material of one polarity lining the inner surface of the inner can, a second active cell material of opposite polarity in said inner can and spaced from said first material, an absorbent spacer layer interposed between said active cell materials, and a helical contact spring having a large diameter portion extending into said cup-shaped inner top disc and a small diameter portion extending into said second active cell material whereby upon crimping down the open end of said outer container said contact spring is axially compressed and its large diameter portion is caused to expand and to firmly grip the inner surface of said cup-shaped disc.

3. An electrical current producing cell comprising, in combination, an open-ended outer can, an open-ended inner can concentrically mounted in said outer can and having its open end terminating in a ridge, a top closure member comprising an outer dished disc and an inner cup-shaped disc having their center portions nested in and their circumferential portions separated from each other, and a sealing grommet molded around said discs in sealing engagement with said ridge, a pressed hollow cathode depolarizer pellet lining the inner can, a tubular absorbent barrier-spacer in contact with the inner surface of said depolarizer, anode material within said tubular spacer, an electrolyte absorbed in said cathode and anode materials and in said spacer, a slug closing the lower end of said tubular spacer to retain the anode material therein, and a helical contact spring having a large diameter portion extending into said cup-shaped inner top disc and a small diameter portion extending into said anode material whereby upon crimping down the open end of said outer container said contact spring is axially compressed with turns of its expanding large diameter portion firmly gripping the interior of said cup-shaped disc while the remainder of such large diameter turns will enter the terminal regions of the tubular spacer and will displace such regions into internal sealing relation with the grommet.

4. The electrical current producing cell according to claim 3, wherein the electrolyte is an aqueous solution of an alkali metal hydroxide and the cathode comprises at least one of the group consisting of manganese dioxide and mercuric oxide.

5. The electrical current producing cell according to claim 3, wherein the anode material is composed of zinc powder and sodium carboxy methyl cellulose.

6. The electrical current producing cell according to claim 3, wherein the anode material is composed of a mixture of dry amalgamated zinc powder and of 0.5 to 4% by weight of dry sodium carboxy methyl cellulose powder which upon contact with the electrolyte is converted into an expanded sodium carboxy methyl cellulose zinc amalgam thoroughly permeated by the electrolyte.

7. An electrical current producing cell comprising, in combination, an open-ended inner can concentrically mounted in said outer can, a top closure member comprising outer and inner top discs nested in each other and an insulative grommet around said discs in sealing engagement with the open end of said inner can, said outer disc being dished and said inner disc being cup-shaped, cathode depolarizer material in the form of consolidated hollow cylinders internally lining said inner can, anode material in the form of preformed hollow cylinders of zinc and sodium carboxy methyl cellulose powders in said inner can and spaced from said cathode material, a first tubular absorbent material interposed between said cathode and anode materials, a helical contact spring having a large diameter portion extending into said cup-shaped inner top disc and a small diameter portion extending into said anode cylinders whereby upon crimping down the open end of said outer container over said grommet said contact spring is axially compressed and its large diameter portion is caused to expand and to firmly grip the inner surface of said cup-shaped disc, a second tubular absorbent material axially extending through said contact spring, and an alkaline electrolyte impregnating said cathode, anode and said tubular absorbents causing expansion of said anode cylinders into contacting relation with the small diameter portion of said contact spring.

References Cited

UNITED STATES PATENTS

| | | | |
|---|---|---|---|
| 2,729,357 | 1/1956 | Nason et al. | 200—15 |
| 2,876,272 | 3/1959 | Bence et al. | 136—107 X |
| 2,941,022 | 6/1960 | Mandel | 136—6 |
| 2,993,947 | 7/1961 | Leger | 136—107 |
| 3,096,217 | 7/1963 | Clune | 136—107 |
| 3,116,172 | 12/1963 | Wilke et al. | 136—107 |
| 3,205,097 | 9/1965 | Clune et al. | 136—107 X |

WINSTON A. DOUGLAS, *Primary Examiner.*

ALLEN B. CURTIS, *Examiner.*

B. J. OHLENDORF, A. SKAPARS, *Assistant Examiners.*